Patented June 17, 1930

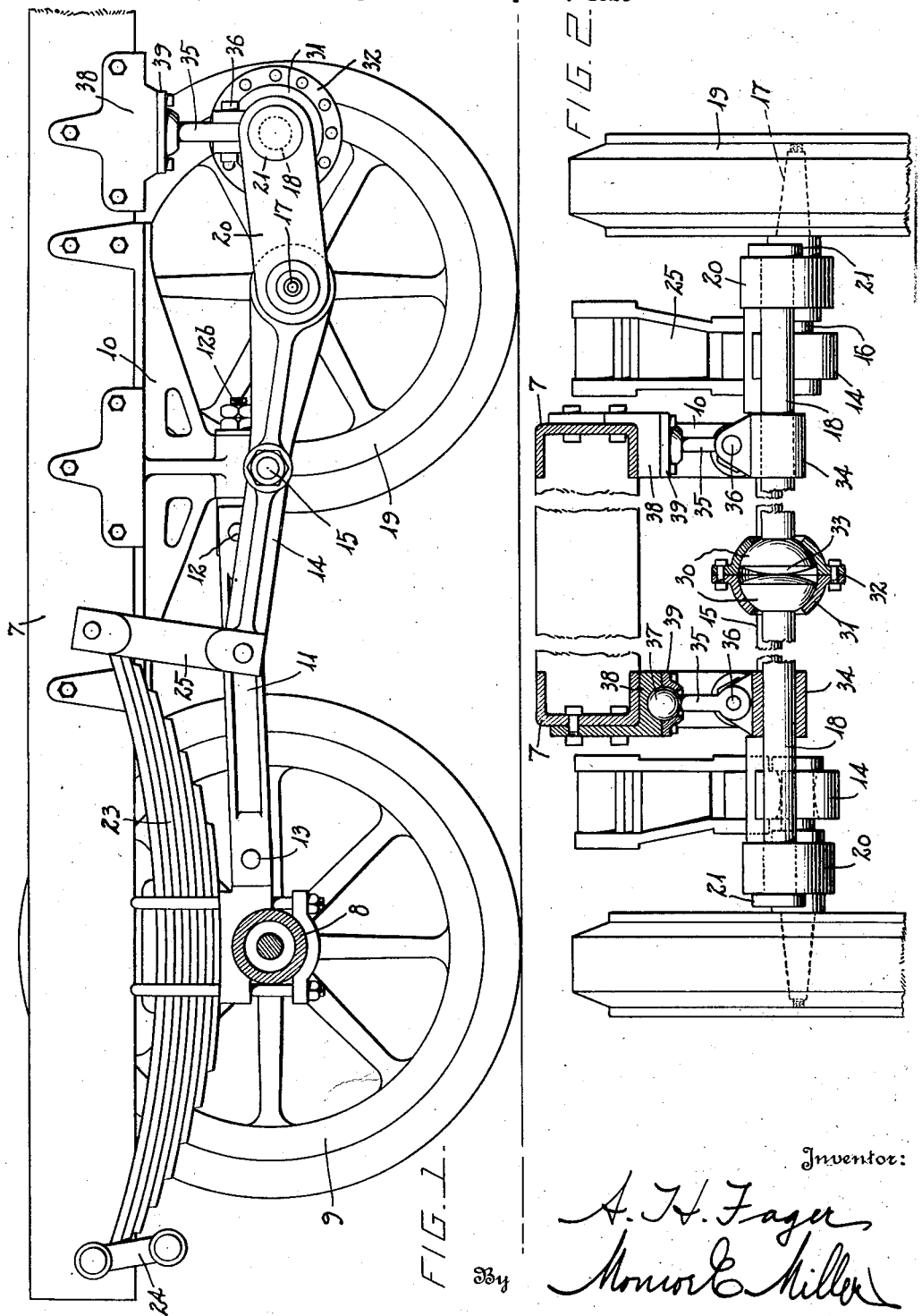
June 17, 1930. A. H. FAGER 1,763,768
VEHICLE RUNNING GEAR
Original Filed Sept. 7, 1926

1,763,768

UNITED STATES PATENT OFFICE

ALBERT H. FAGER, OF LOS ANGELES, CALIFORNIA

VEHICLE RUNNING GEAR

Application filed September 7, 1926, Serial No. 134,053. Renewed September 9, 1929.

The present invention relates to vehicle running gears of the type shown and described in Letters Patent No. 1,620,809, issued to me March 15th, 1927, and is an improvement thereon.

Broadly considered, my invention includes means for attaching a pair of extra rear wheels to a four-wheeled motor vehicle, to obtain a distribution of the load over the four rear wheels and to permit free and independent vertical movement of the extra wheels relative to the vehicle frame, without the necessity of using a continuous axle for the extra wheels and universal joints, as shown in my above mentioned Letters Patent No. 1,620,809.

One object of this invention is the provision of novel means for attaching a pair of extra wheels to a motor truck or other vehicle, including an axle connecting said wheels and the intermediate portion of which is not capable of vertical movement relatively to the vehicle body or frame.

Another object of the invention is to provide an axle of the character indicated permitting the wheels to have independent movements relatively to one another and to the vehicle frame, without the necessity of using a floating or free axle.

A still further object is the provision of a novel crank axle and means for connecting same with the vehicle frame.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a side elevation of the improved structure, with the near wheels removed and one axle shown in section.

Fig. 2 is a transverse section, portions being shown in elevation and portions being broken away.

Only a portion of a motor truck chassis is shown in the drawing, including the frame 7 and rear axle housing 8, the attachment being applied to the rear axle of the truck as shown, and the rear axle has a wheel 9 at the end, as usual.

In applying the attachment to the chassis, a depending bracket or rigid hanger 10 is suitably secured to the frame 7 at each side thereof in front of the rear axle housing 8, and a radius bar 11 is pivoted, at its rear end, as at 13, to the axle housing 8, and has its forward end pivoted, as at 12, to a pintle 12$^b$ mounted for rotation within the bracket 10, thereby providing a universal joint connection between the radius bar 11 and bracket 10, permitting the rear axle to move upwardly and downwardly and to oscillate.

A lever or rocker member 14 is disposed at each side of the chassis, at the outer side of the corresponding bracket 10, and said levers are mounted between their ends on a transverse rod or shaft 15 extending through the brackets 10 immediately below the pintles 12$^b$. Said levers or members 14 thus oscillate about the transverse axis of the rod or shaft 15.

The attachment may include an extra axle having the sections 18, which is a crank axle as shown, and said axle sections 18 have rearwardly extending crank arms 20 at their opposite ends provided with spindles 16 having the outer portions 17 on which the extra pair of wheels 19 are mounted for rotation. The inner portions of the spindles 16 are mounted in the forward arms of the levers 14 for oscillatory motion, to permit the axle sections to oscillate slightly relatively to one another, and the spindles 16 and wheels 19 are movable upwardly and downwardly relatively to the frame 7 with the forward arms of the levers 14.

In order to distribute the stresses and strains between the two axles, the levers 14 and axle 8 are operatively connected. As shown, the usual or customary semi-elliptical laminated leaf springs 23 are secured by suitable clamps on the axle housing 8 for supporting the frame 7 yieldably on said axle housing, the rear ends of the springs 23 being connected by shackles 24 with the rear end portion of the frame 7 in any well known manner. The forward ends of the springs 23 are connected by links 25 with the rear arms of the levers 14. Therefore, part of the weight of the load is transmitted from the frame 7 to the rear ends of the springs and thence to the rear axle, and part of the weight is transmitted by the brackets 10 to the levers 14 from which it is distributed to the rear axle and supplementary axle. When a stress or strain occurs, tending to move the axle 8 and frame 7 toward one another, there is a tendency to move the levers 14 downwardly and the springs 23 upwardly relatively to one another, the levers 14 being swung downwardly on the spindles 16, whereby the downward pull on the links 25 will flex or bend the forward portions of the springs 23. The same action occurs when the wheels 19 pass over an obstruction, inasmuch as the levers 14 are swung (counter clock-wise as seen in Fig. 1) to pull the links 25 and forward terminals of the springs 23 downwardly, thereby imposing greater pressure on the rear axle 8. When the frame 7 and axle 8 moves toward one another, such as when the wheels 9 pass over an obstruction, there is a tendency for the springs 23 to raise the links 25, thereby swinging the rear arms of the levers 14 upwardly and imposing greater pressure on the supplementary axle, the springs 23 yielding to distribute the stresses and strains between the two axles and pairs of wheels.

In the present construction, the body or intermediate portion of the supplementary axle need not move vertically with reference to the frame 7. The axle sections 18 are adapted to oscillate and rotate relatively to one another, to permit the wheels 19 to move independently of one another when passing over irregularities in the surface of the road. A universal joint is employed for connecting the adjacent ends of the axle sections 18 which are formed at their adjacent ends with the hemispherical enlargements 30 disposed in parti-spherical collars 31 that have outstanding flanges 32 at their adjacent edges bolted or otherwise fastened together. The enlargements 30 have confronting convexed faces 33 contacting with one another for relative rocking motion. The adjacent ends of the axle sections 18 are thus connected together by a joint permitting the axle sections to oscillate and rotate relatively to one another, but preventing the axle sections from separating, so as to maintain the wheels 19 in proper spaced relation.

Each axle section 18 is mounted in a bearing 34, and said bearings are suspended from the frame 7 by hangers 35. The lower ends of the hangers are pivoted, as at 36, to the bearings 34, and the upper ends of the hangers are flexibly connected with the frame 7, thereby permitting said hangers to oscillate and accommodate the movements of the axle sections 18. The axis of the pivots 36 extend longitudinally of the vehicle, and, as shown, ball and socket joints are provided between the hangers 35 and frame 7. Thus, the hangers 35 have balls 37 at their upper ends seated between members 38 secured to the frame 7 and retainer members 39 secured to the members 38. The hangers 35 suspend the axle from the frame, and the axle sections 18 turn relatively to one another, such as when one crank arm 20 moves upwardly while the other moves downwardly relatively to the frame 7. The supplementary axle does not carry any of the load but its function is to maintain the wheels 19 in proper transversely spaced relation, without impairing with the individual movements of the wheels 19 upwardly and downwardly when passing over obstructions.

While in my preferred construction the supplementary axle, including sections 18, may be used to maintain wheels 19 in alinement without imposing lateral strains on arms 14, in the broader aspects of my invention the supplementary axle may be dispensed with and spindles 16, in the nature of separate stub axles, may be fixedly carried by the forward ends of levers 14.

Having thus described the invention, what is claimed as new is:—

1. The combination of a vehicle frame, a pair of wheels, a crank axle connecting said wheels and having a flexible joint between its ends, means connecting said axle to the frame for the forward and rearward movement of the axle relatively to the frame, and a yieldable connection between the wheels and frame for transmitting the load from the frame to the wheels.

2. The combination of a vehicle frame, a pair of wheels, a crank axle connecting the wheels and having a flexible joint between its ends, hangers connecting said axle and frame, and a yieldable connection between the wheels and frame for transmitting the load from the frame to said wheels.

4. The combination of a vehicle frame, a pair of wheels, a crank axle connecting the wheels and having a flexible joint between its ends, bearings for the axle connected to the frame for forward and rearward movement, and a yieldable connection between the wheels and frame for transmitting the load from the frame to the wheels.

4. The combination of a vehicle frame, a pair of wheels, a crank axle connecting said wheels and having a flexible joint between its ends, bearings for the axle, hangers connecting said bearings and frame, and a yieldable connection between said wheels and frame for transmitting the load from the frame to said wheels.

5. The combination of a vehicle frame, a pair of wheels, a crank axle composed of two sections having a flexible joint between them and having crank arms at their opposite ends extending longitudinally of the frame and connected to the wheels, means connecting the axle sections to the frame for oscillatory motion, and a yieldable connection between the crank arms and frame for transmitting the load from the frame to the wheels.

6. The combination of a vehicle frame, a pair of wheels, a crank axle composed of two sections having a flexible joint between them and having crank arms at their opposite ends extending longitudinally of the frame, said arms having spindles on which said wheels are mounted, means connecting the axle sections to the frame for oscillatory motion, and a yieldable connection between said spindles and frame for transmitting the load from the frame to said wheels.

7. The combination of a vehicle frame, a pair of wheels, a crank axle composed of two sections having a flexible joint between them permitting relative oscillatory and turning movements of said axle sections, said axle sections having crank arms at their opposite ends extending longitudinally of the frame and connected to said wheels, bearings for said axle sections, hangers connecting said bearings and frame for the oscillatory movement of said bearings, and a yieldable connection between said arms and frame for transmitting the load from the frame to said wheels.

8. The combination of a vehicle frame, a pair of wheels, a crank axle composed of two sections having a flexible joint between them and having crank arms at their opposite ends extending longitudinally of the frame, said arms having spindles on which the wheels are mounted, means connecting the axle sections to the frame for oscillatory motion, levers pivotally connected with the frame and connected with said spindles, and spring means connected between said levers and frame.

9. A vehicle having a frame and a front axle with wheels thereon, a rear axle, drive wheels on said rear axle, levers pivotally mounted intermediate their ends on opposite sides of the frame, stub axles carried at one end of said levers, extra wheels on said stub axles, and yielding means operatively connecting the opposite ends of said levers with the rear axle and the frame, for transmitting the load to the drive wheels and the extra wheels, whereby independent vertical movement of the extra wheels, relative to the frame, is permitted.

10. A vehicle having a frame and a front axle with wheels thereon, a rear axle, drive wheels on said rear axle, levers pivotally mounted intermediate their ends on opposite sides of the frame, leaf springs mounted intermediate their ends on the rear axle and pivotally connected at one end to the frame, their opposite ends being pivotally connected to the adjacent ends of the levers, stub axles carried at the opposite ends of said levers and extra wheels on said stub axles, whereby independent vertical movement of the extra wheels, relative to the frame, is permitted.

In testimony whereof I hereunto affix my signature.

ALBERT H. FAGER.